M. E. MYERS AND M. A. J. HARPER.
CINEMATOGRAPH MACHINE.
APPLICATION FILED MAR. 29, 1917. RENEWED APR. 4, 1919.
1,307,984.
Patented June 24, 1919.
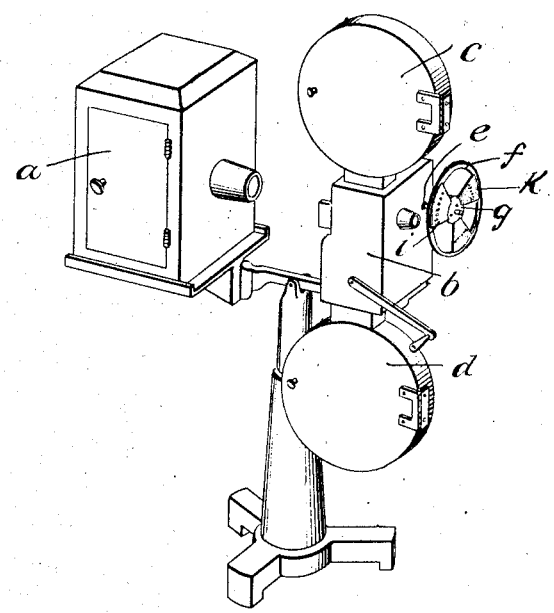
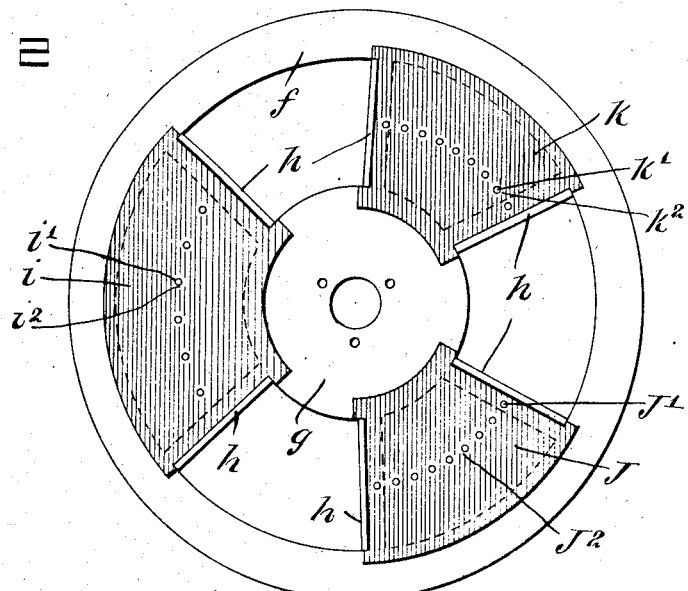

UNITED STATES PATENT OFFICE.

MORTON EARLE MYERS AND MARTIN A. J. HARPER, OF NEW YORK, N. Y.

CINEMATOGRAPH-MACHINE.

1,307,984.      Specification of Letters Patent.      Patented June 24, 1919.

Application filed March 29, 1917, Serial No. 158,178. Renewed April 4, 1919. Serial No. 287,616.

*To all whom it may concern:*

Be it known that we, MORTON EARLE MYERS, a citizen of the United States, and MARTIN A. J. HARPER, a subject of the King of the United Kingdom of Great Britain and Ireland, both residing at the borough of Manhattan, city, county, and State of New York, have invented certain new and useful Improvements in Cinematograph-Machines, of which the following is a specification, reference being had therein to the accompanying drawings, which form a part thereof.

Our invention relates to cinematograph machines, and more particularly to the shutter mechanism thereof.

Heretofore in machines of this character various shutter mechanisms have been employed, the purpose of which has been to eliminate or reduce what is known as a "flicker" in the reproduction. In the older types of machines and in most of the machines now used, the shutter includes a plurality of rotating opaque blades intercepting the light rays emanating from the projector, one of these blades being operative during the interval when the film is receiving movement, and the other blades being used to balance the light effects, so as to make the effect upon the projected image less conspicuous. While this type of shutter has proved commercially successful, it is open to the objection that the alternate lighting and shading of the screen, owing to persistance of vision, results in an optical illusion known as a "flicker". To obviate this difficulty, it has been attempted to use a shutter which by reason of its semi-opacity, or by the lens-like effect thereof will merely dim the light upon the screen, or will diffuse the light in a manner to prevent the casting of deep shadows upon the screen, between the projection or images thereon. These expedients have not proven successful in use, because if a sufficient volume of light reaches the screen, the movement of the film will be apparent to the eye, this movement resulting in vertical streaks, or elongations of both the light and dark tone of the picture, which elongations are known to the art as "ghosts". When the light is diffused or refracted by means of lens-like formations, there is a light effect in the auditorium, which detracts from the quality of the projected image.

By experiment and use, we have determined that a small perforation in any part of a shutter blade will result in the projection of a complete image upon the screen and that by dimming the major portion of the light rays while permitting the image to be repeatedly and rapidly projected through a series of small openings, the flicker so objectionable with ordinary shutters may be practically eliminated, and the elongation of the tones of the film, or "ghosts", may be entirely eliminated. By making the cover blade and the flicker blade or blades of substantially white, translucent material, a suitable effect may be secured without casting a dark shadow upon the screen during the interval when the film has movement, and by providing transparent portions about each of the various small openings through the shutter blades sufficient light will pass to the screen to avoid grayness of the reproduction, or secure sharp contrasts between the dark and light tones of the reproduction.

Our invention consists primarily in a cinematograph machine embodying therein a shutter composed of a cover blade and a flicker blade each formed of translucent material having a sequence of small openings therethrough; and in such other novel features of construction and combination of parts, as are hereinafter set forth and described, and more particularly pointed out in the claims hereto appended.

Referring to the drawings,

Figure 1 is a perspective view of a cinematograph machine embodying therein a shutter made in accordance with our invention; and Fig. 2 is a detail view of the shutter detached from the machine.

Like letters refer to like parts in both views.

In the accompanying drawings, we have shown an ordinary cinematograph machine embodying therein a lamp structure shown at $a$, a lens box $b$ in which the feeding mechanism for the film is inclosed and film reel cases $c$—$d$. This mechanism is old and well known in the art, and no particular construction thereof is essential to our invention.

Carried by a rotating shaft $e$ is a shutter consisting of a suitable frame $f$ and a hub $g$ connected by a plurality of spokes $h$. In the form of the invention shown, six of such spokes are used, there being secured between each alternate pair of spokes, a thin sheet of white, translucent material, such as celluloid, forming a cover blade $i$ and two flicker blades $j$—$k$ open spaces being present between said blades. While in the accompanying drawings, we have shown two flicker blades, it is not our intention to limit ourselves to the use of this number, since with different projectors and under different conditions of use, it is feasible to use only one flicker blade.

Each of the blades $i$—$j$—$k$ is like the others, except as to the area thereof, the cover blade, when three blades are used, being of greater area than either of the flicker blades.

The blade $i$ is provided with a sequence of small openings $i'$ arranged substantially concentric with the axis of rotation of the shutter, these openings being substantially one-sixteenth of an inch ($\frac{1}{16}''$) in diameter. Similar openings $j'$—$k'$ are provided in the blades $j$—$k$. About each of the openings $i'$—$j'$—$k'$, we provide a small area $i^2$—$j^2$—$k^2$ which is substantially transparent, so as to secure a better illumination of the screen during those intervals when an image shows through the openings $i'$—$j'$ or $k'$ successively.

The spokes $h$ are preferably made of sheet metal folded upon itself, so as to form a clamp adapted to engage the edge of the cover and flicker blades, these spokes being sufficiently narrow to avoid likelihood of their casting a shadow while the machine is in operation. In fact, if desired, these spokes might be dispensed with and other suitable means for imparting rigidity to the different blades substituted therefor.

The operation of a cinematograph machine embodying our invention is substantially as follows.

When a machine is in operation, the shutter receives one full rotation with the exposure of each individual photograph at the sight opening of the projector. Upon the initiation of the feeding movement of the film, the forward edge of the blade $i$ will pass before the lens opening, intercepting a portion of the light rays but having the effect of merely dimming the light effect upon the screen. The translucency of this plate, while preventing a dense shadow effect upon the screen, will nevertheless prevent the projection of the image therethrough in a manner to permit it to appear upon the screen in a sufficiently well defined form to be perceptible to the eye. As each of the openings $i'$, however, passes the lens opening, a complete image will be projected upon the screen, and sufficient light will pass through each area $i^2$ to secure a fairly bright light upon the screen and prevent continuity of the darker tone resulting from the effect from the other portions of the blade. The translucent portion of the blade $i$ between the areas $i^2$ will make the projection of these images intermittent, so that the movement of the film will not be perceptible to the eye; or in other words, elongation of these images by reason of the rapidity of the movement of the film, or "ghosts," will be completely eliminated. The rapid flashing and dimming of the images, resulting from the projection of light rays through the moving cover blade, will be so rapid that a picture effect will not be impressed upon the eye, or if the eye does perceive this image, it will be as a stationary image and not as a moving image. If the openings $i'$ are not small, this effect will not be secured, because the exposure of the picture through these openings, will be of sufficient duration to not only give a clear, well defined image, but also to give an impression of movement in the image upon the screen.

The blade $i$ will pass from before the lens opening substantially simultaneously with the cessation of the feeding movement of the film. Immediately upon the film coming to rest, the maximum volume of light will pass through the opening between the cover blade and the first flicker blade and in succession thereafter the flicker blade $j$ will pass before the lens opening followed by an open space, the flicker blade $k$ and the open space between same and the cover blade. In this manner while the picture is stationary the light rays will be alternately dimmed and undimmed, the rapidity of movement of the shutter being such as to secure the effect of a uniform volume of light at all times including that period when the cover blade is operative. As each of the flicker blades passes the lens opening, the openings $j'$—$k'$ and the transparent areas $j^2$—$k^2$ thereof, will permit the repeated, rapid projection of the image through these blades so as to secure the effect of continuity of exposure of the image upon the screen without, however, permitting such a continuous exposure, in fact, with its resultant sharp contrast between the light effects upon the screen during that interval when the cover blade is operative, and when the cover blade is not operative.

The effect secured by a shutter made in accordance with our invention, is not only a more uniform illumination of the screen with a resultant increase in the definition of the image, but it is possible to secure much more artistic reproduction of the image with a light of lower candle power, than is required with other types of shutters.

By avoiding a complete interception of the light rays during any portion of the revolution of the shutter, and by interposing successive large areas of white, translucent material having a sequence of openings therethrough, alternated with openings in the shutter permitting the maximum volume of light to pass, we secure a substantially uniform lighting effect upon the screen, thus avoiding the sharp contrast between a completely darkened, and a brightly illuminated screen.

We have found in actual practice that to secure the desired quality of the projected image, it is essential to use both a cover blade and a flicker blade of substantially the same construction and that the use of a cover blade alone, even if constructed as described will not eliminate the flicker, or secure the quality of definition desired in the reproduction.

It is not our intention to limit the invention to the precise details of construction shown in the accompanying drawings, it being apparent that such may be varied without departing from the spirit and scope of the invention.

Having described the invention what we claim as new and desire to have protected by Letters Patent is:—

1. A cinematograph machine embodying therein a shutter composed of a cover blade and a flicker blade each formed of translucent material, said material having a substantially transparent area, and an opening therethrough within said transparent area.

2. A cinematograph machine embodying therein a shutter composed of a cover blade and a flicker blade, each formed of translucent material having a sequence of small openings therethrough, and substantially transparent areas about each of said openings.

3. A cinematograph machine embodying therein a shutter composed of a frame, a hub by means of which said shutter may be rotated, a cover blade and a flicker blade supported respectively between said hub and said frame, open spaces being provided within said frame between said blades, each of said blades being formed of translucent material, said material having a substantially transparent area and an opening therethrough within said transparent area.

4. A cinematograph machine embodying therein a shutter composed of a frame, a hub by means of which said shutter may be rotated, a cover blade and a flicker blade supported respectively between said hub and said frame, open spaces being provided within said frame, between said blades, each of said blades being formed of translucent material having a sequence of small openings therethrough, and a transparent area about each of said openings.

5. A cinematograph machine embodying therein a shutter composed of a cover blade and a flicker blade, each formed of translucent material having a sequence of small openings therethrough, and substantially transparent areas about each of said openings, said transparent areas being separated by translucent areas.

6. A cinematograph machine embodying therein a shutter composed of a cover blade and a flicker blade, each formed of translucent material having a line of closely, juxtaposed, small openings therethrough substantially concentric with the axis of rotation of said shutter.

In witness whereof, we have hereunto affixed our signatures, in the presence of two subscribing witnesses, this 28th day of March, 1917.

MORTON EARLE MYERS.
MARTIN A. J. HARPER.

Witnesses:
CLARICE FRANCK,
BERTHA MUELLER.